Sept. 16, 1947.  C. C. WAITE ET AL  2,427,429
LIQUID DISPENSING APPARATUS
Filed Oct. 6, 1942  5 Sheets-Sheet 1

INVENTORS
CHARLES C. WAITE
PHILIP F. BENDER
LESLIE ARNETT
BY
ATTORNEYS

Patented Sept. 16, 1947

2,427,429

UNITED STATES PATENT OFFICE 2,427,429

LIQUID DISPENSING APPARATUS

Charles C. Waite, Roselle Park, and Philip F. Bender, Jersey City, N. J., and Leslie Arnett, New York, N. Y., assignors, by mesne assignments, to Stewart Products Corporation, a corporation of Delaware Application October 6, 1942, Serial No. 460,942

9 Claims. (Cl. 225—21)

This invention relates to liquid dispensing, and more particularly to beverage dispensing.

It is an object of the invention to provide dispensing mechanism including improved measuring, mixing, and delivery mechanism and also to provide such mechanism, particularly in connection with machines for dispensing carbonated beverages, such that uniformity of temperature and carbonation is obtained under widely differing conditions.

It is an object of the invention to provide hydraulic actuating mechanism for mixing and dispensing apparatus which is suitable for use in automatic beverage dispensing machines and provides greatly improved action over the electrically actuated and other devices heretofore used.

It is a further object of the invention to provide improved valve mechanism and valve arrangements for dispensing liquids.

With these and still other objects which will appear in the following full description in mind, the invention consists in the combinations and arrangements of parts and details of construction which will now be fully described in connection with the accompanying drawing and then more particularly pointed out in the appended claims.

Figures 1, 2:
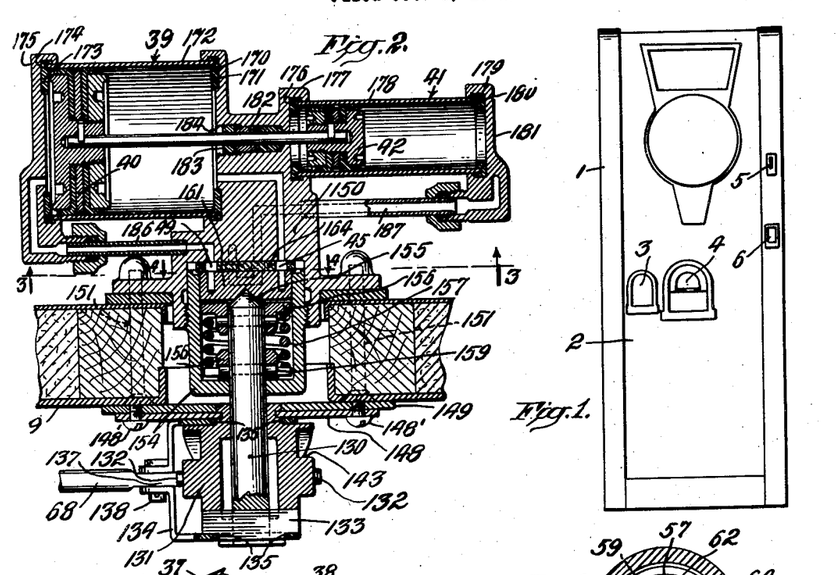
Figure 1 is a front elevation of an automatic beverage dispensing machine embodying the invention according to a preferred form of embodiment.
Figure 2 is a horizontal section through the measuring and mixing valve apparatus of the machine of Figure 1, and is taken on the line 2—2 of Figure 16.

Having reference now to Figure 1, the machine of the invention will normally be enclosed in a cabinet 1 such as there shown and provided with a front door 2, which has openings 3 and 4 for receiving used cups and delivering filled cups, respectively. A coin slot 5 and coin return opening 6 will normally be provided, and, as will be understood, the door 2 will be hinged or otherwise adapted to opening so as to provide access to the interior of the cabinet for servicing. The specific cabinet construction forms no part of the present invention and, accordingly, requires no further description.

Figure 7:
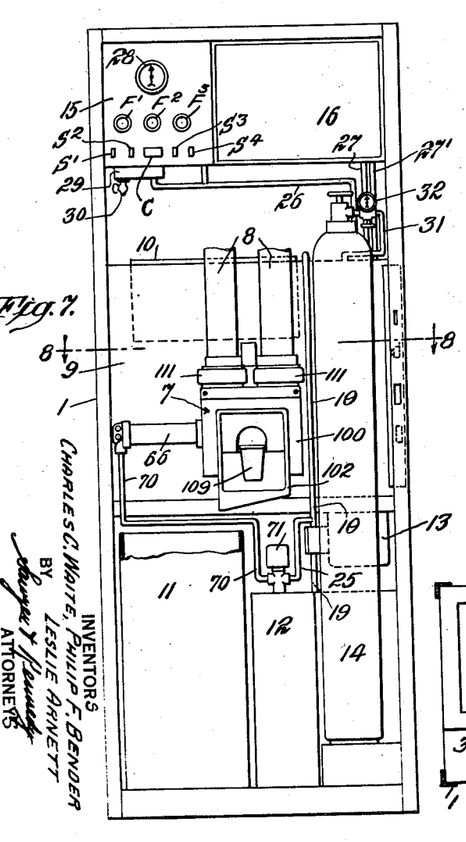
Figure 7 is a front elevation of the machine of Figure 1 on an enlarged scale and with the cabinet removed to show the interior.
Figures 8, 9:
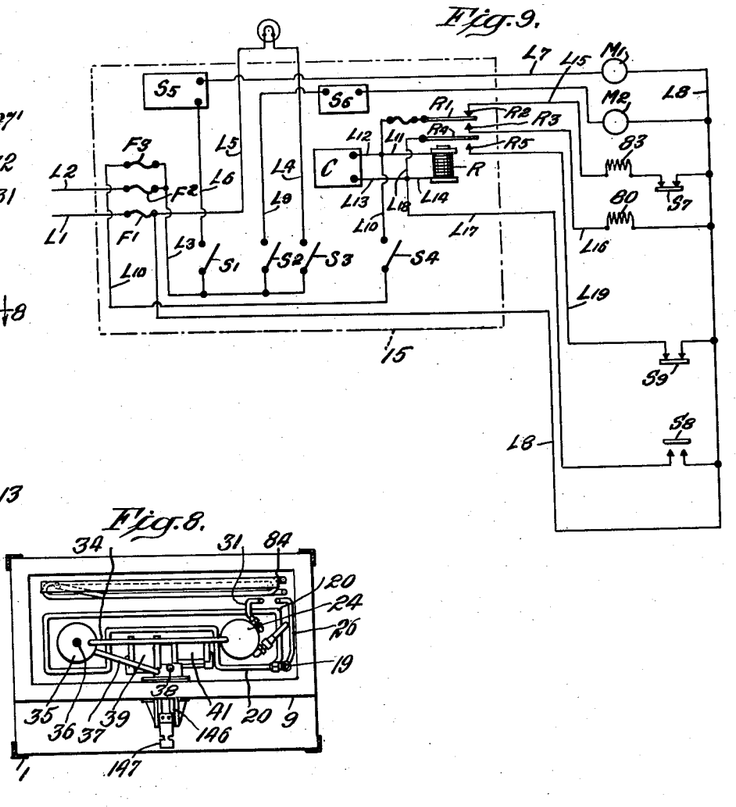
Figure 8 is a horizontal section taken on the line 8—8 of Figure 7 and showing the apparatus within the cooling tank.
Figure 9 is a schematic circuit diagram.
Figure 16:
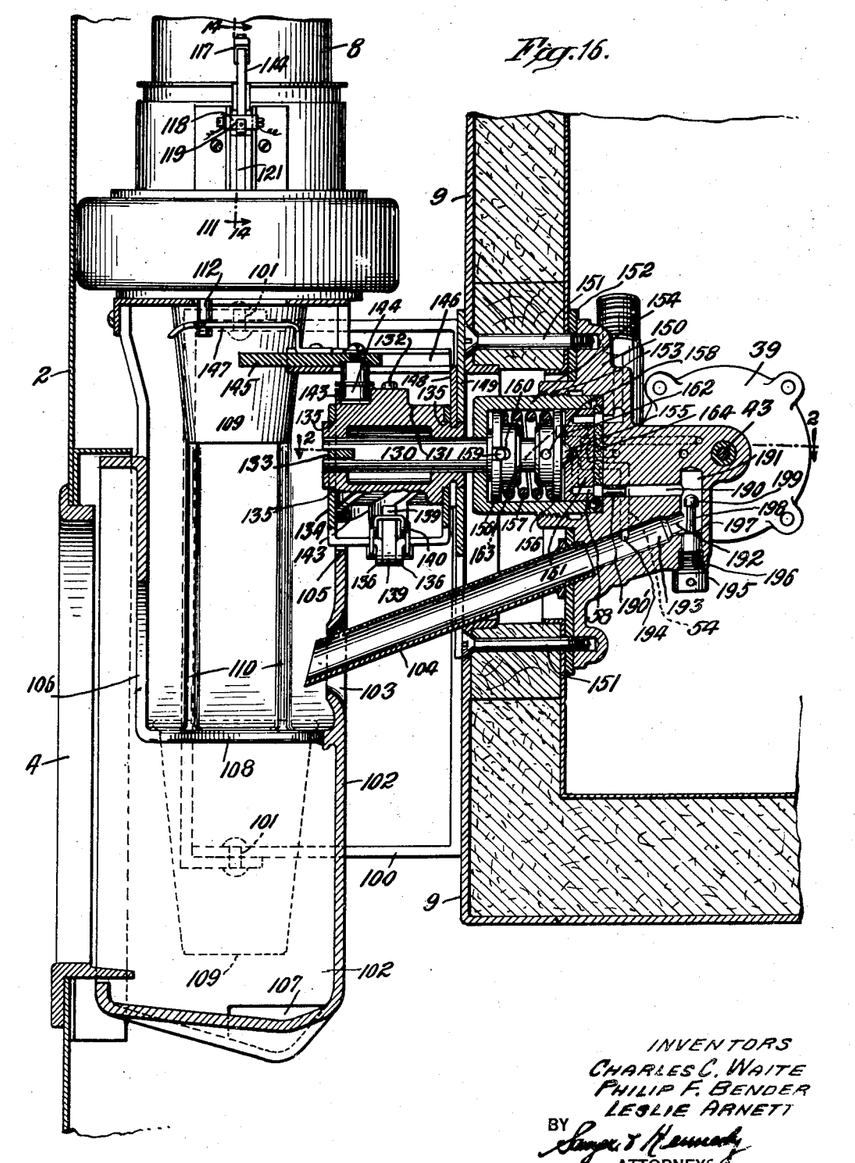
Figure 16 is a vertical section taken on the line 16—16 of Figure 12.

As shown in Figure 7, the general apparatus within the cabinet 1 includes a delivery assembly 7 surmounted by tubular cup holders and dispensers 8, this apparatus being mounted in front of a cooling water tank 9, which contains the carbonating and mixing apparatus, as shown in Figure 8, and is preferably heat insulated as indicated in Figure 16. A syrup container 10 is placed upon cooling water tank 9 so as to immerse its lower part therein. In the lower part of the machine are placed a waste container 11, water container 12, electric motor driven water pump 13 and carbon dioxide cylinder 14. In the upper part of the cabinet are a control panel 15 and refrigerating unit 16. These various elements are provided with suitable gauges, piping connections and electrical controls, all as later described in detail.

General construction and operation

Figures 3, 4, 5, 6:
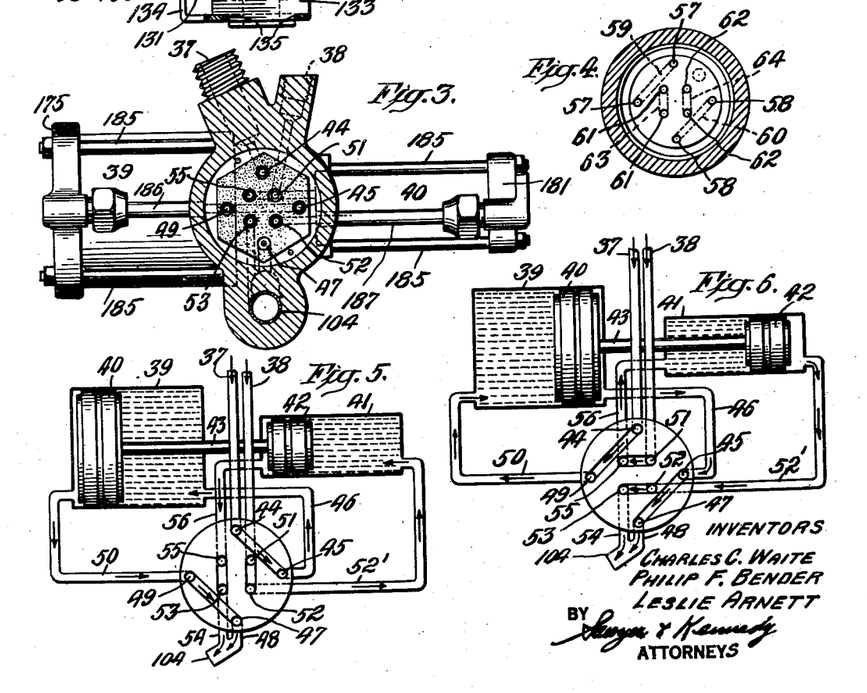
Figure 3 is a vertical section taken on the line 3—3 of Figure 2.
Figure 4 is a detail view of the valve of Figure 2 and is taken on the line 4—4 of Figure 2.
Figures 5 and 6 are flow diagrams showing schematically the operation of the mechanism of Figure 2.
Figure 10:
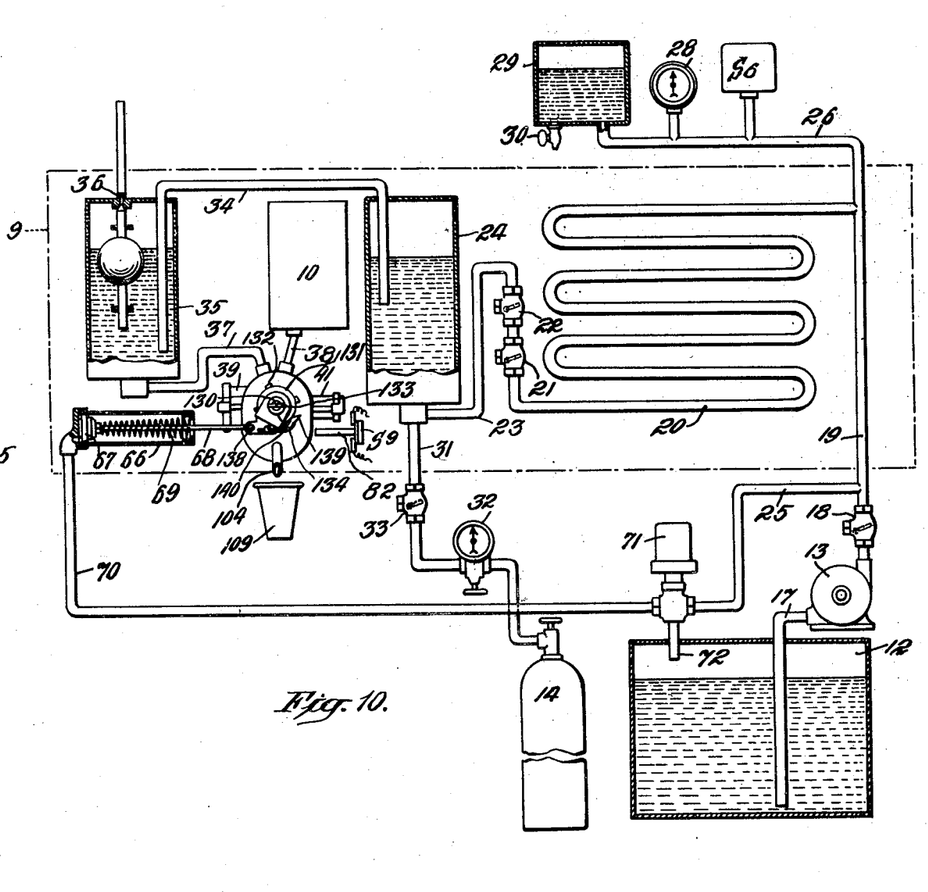
Figure 10 is a schematic diagram of the apparatus included within the machine of Figures 1 and 7.

The functions and inter-relations of the various elements of the machine are most simply shown in the general flow diagram of Figure 10 and the mixing unit flow diagrams of Figures 5 and 6. The water tank 12, syrup container 10 and carbon dioxide cylinder 14, previously referred to, contain the ingredients to be mixed. Any of the usual syrups may be used, depending on the beverage desired, and ordinary tap water will be found suitable in localities having a satisfactory pure water supply.

Water is taken from tank 12, through intake pipe 17, by pump 13 and delivered through check valve 18 and pipe 19 to cooling coil 20, from which it passes through check valves 21 and 22, and pipe 23 into carbonating tank 24.

The carbonating tank 24 may conveniently comprise a combined unit of familiar type including also the check valves just referred to.

Also connected with pipe line 19 are a pipe line 25, leading to a hydraulic operating system for the mixing unit, later described, and a pipe 26 connecting to a pressure control switch S6, pressure gauge 28 and air chamber 29. Pressure switch S6 serves to start and stop pump 13 upon the pressure falling below or rising above set limits, and the air chamber 29 serves to avoid water hammer in the customary way, and to assist in maintaining pressure in the pressure system composed of line 19 and cooling coil 20. Excess water may be drained off from chamber 29 through cock 30, in case of flooding.

Carbon dioxide cylinder 14 is also connected to carbonating tank 24 through a pipe line 31 containing a pressure regulator 32, which includes a reducing valve and a pressure gauge, and containing also a check valve 33.

Carbonated water passes from tank 24 through the line 34 into an equalizer tank 35, provided with a float controlled vent 36, and thence through pipe 37 into the mixing unit. Syrup, in turn, is fed to the mixing unit from tank 10, through a short straight pipe 38.

The cooling and carbonating apparatus thus far described is by way of illustration only, commercial units including the cooling coil, carbonating cylinder and equalizing cylinder, together with their check valve and interconnections being satisfactory for use in the machine of the invention.

The measuring and mixing unit of the invention constitutes an important feature of the present invention and is described as to structure in full detail later in this specification.

Having reference now to the flow diagrams of Figures 5 and 6, there is provided a water cylinder 39 having a piston 40 for delivering a measured quantity of carbonated water at each operation of the machine and also a syrup cylinder 41 having a piston 42 for delivering a measured quantity of syrup from container 10 at each operation of the machine. Pistons 40 and 42 are carried on a common piston rod 43 so as to work together and are conveniently driven by pressure of carbonated water from tank 35 acting on piston 40.

The operation of the measuring and mixing apparatus is controlled by a valve mechanism, best shown in Figures 2, 3, 4, 5, 6 and 16. The valve mechanism and associated discharge passages, later described, while shown as applied to the preferred form of measuring apparatus may be employed also in dispensing mechanism operating on the familiar time and orifice principal. The valve comprises a seat having a set of ports for handling carbonated water and a set of ports for handling syrup. In the embodiment chosen for illustration, the outer set of ports is used for the carbonated water and the inner set for the syrup. The uppermost carbonated water port 44 (Figures 3 and 5) communicates with pipe line 37 and thus with tank 35. The right hand port 45 communicates through a passage 46 with the right hand or inner end of water cylinder 39. The lowermost port 47 communicates with a discharge passage 48, and the left hand port 49 communicates through a line 50 with the left hand or outer end of water cylinder 39. The syrup ports are similarly connected, one of these ports, 51, communicating with pipe 38 and thus with the syrup tank 10; another, 52, through a line 52', with the right hand or outer end of syrup cylinder 41; another, 53, with a discharge passage 54 and the last port, 55, through a passage 56, with the left hand end of syrup cylinder 41. A rotary movable valve member containing eight corresponding ports, together with cross connections as shown in Figure 4, is provided for controlling the operation of the mixing and delivery apparatus. As best shown in Figure 4, two pairs of outer ports 56 and 58 are provided, these being connected together by passages 59 and 60 respectively, and being adapted to register with the outer ports 44, 45, 47 and 49. Similarly, two pairs of inner ports 61 and 62, interconnected respectively by passages 63 and 64, are provided and are adapted to register with the inner ports 51, 52, 53 and 55.

In the operating condition shown in Figure 5, the valve has been rotated so as to connect passage 37 to passage 46, and line 50 to the discharge passage 48. Similarly, with respect to the syrup cylinder, pipe 38 is connected with line 52' and passage 56 with the outlet passage 54. This represents a condition in which a measured quantity of beverage has been delivered and the apparatus is in condition for re-operation. Such operation is effected by rotating the valve through 90° (counter-clockwise in the construction illustrated) so as to connect passage 37 and discharge 48 with the opposite ends of the water cylinder 39 and similarly to connect pipe 38 and discharge passage 54 with the opposite ends of syrup cylinder 41. The cutting off of the connection between the pipe 37 and the right hand end of water cylinder 39 and the connection of the right hand end of the water cylinder to discharge outlet 48 permits the piston 40 to move to the right, discharging the carbonated water contained in the cylinder through discharge passage 48. The movement of the piston is accomplished by the pressure of the carbonated water which is communicated to the left side of the piston 40 as soon as pipe 37 has been connected to the left end of cylinder 39 by turning the valve to the position of Figure 6. As will be observed, this turning of the valve simultaneously discharges the carbonated water from the right side of the cylinder and refills the left side of the cylinder. The motion of piston 40 is communicated through rod 43 to syrup piston 42, discharging syrup from the right end of syrup cylinder 41 and simultaneously refilling the left hand end of cylinder 41, preparatory to a second operation.

As will be apparent, a 90° turn of the valve from the position of Figure 6 will re-establish the connections of Figure 5, delivering carbonated water and syrup from the left ends of the cylinders and refilling the right ends. In this way, by turning the valve in successive 90° steps, measured quantities of carbonated water and syrup are delivered and the cylinders are simultaneously recharged for the next delivery operation.

The operation of the valve is brought about by a hydraulic actuating mechanism (Figure 10) including a cylinder 66 which contains a piston 67 connected to the valve by a piston rod 68 and ratchet mechanism later to be described, and serving to rotate the valve through 90° at each stroke of the piston. The piston is normally biased to the left by a spring 69 and the left end of the cylinder 66 is connected through a pipe line 70 to a three-way solenoid valve 71, by means of which it may be connected either to pipe 25 communicated with water pipe 19, previously referred to, or to a return or drain pipe 72, leading into water tank 12.

Figure 11:
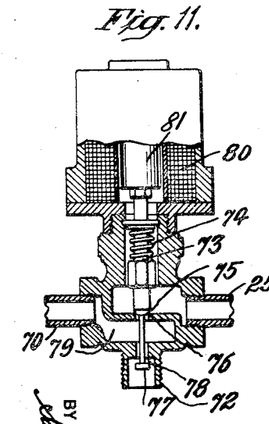
Figure 11 is a detail view showing the construction of a solenoid water valve.

The construction of solenoid valve 71 is shown in Figure 11. As there shown, a valve rod 73 is biased downwardly by a spring 74 so as normally to seat a poppet valve 75 in a valve seat 76 and to leave a second poppet valve 77, adapted to seat in valve seat 78, normally open. Under this condition, an internal valve passage 79 connects pipe 70 with return pipe 72 and pipe 25 is closed off by valve 75. When solenoid winding 80 is energized, valve rod 73 is lifted by plunger 81 working against spring 74 so as to open valve 75 and close valve 77. Under this condition, pipes 70 and 25 are connected together and return pipe 72 is closed off. In this way, through solenoid valve 71 and by utilizing the water pressure in pipe 19, the entire cycle of operations previously described is performed. As later described, solenoid valve 71 is energized at each operation of the machine, as by a coin-operated switch, and is deenergized at the completion of each stroke of piston rod 68 by a limit switch, which switch is momentarily opened by the piston rod striking an operating plunger 82 and serves through appropriate circuit connections to deenergize solenoid valve 71 and to put the electrical circuits in condition for a repeated operation. As will be understood, upon the deenergizing of solenoid valve 71, spring 69 returns piston 67 to the position of Figure 10.

*Control mechanism and circuits*

The general control circuits of the machine are shown in Figures 7 and 9. Current is supplied by main line connections L—1 and L—2 through fuses F—1 and F—2 for energizing the various necessary circuits, suitable manually operated switches S—1, S—2, S—3 and S—4 for these circuits being provided upon the control panel 15. The various circuits and apparatus controlled thereby may be traced in the following manner: Provision may be made for lighting the cabinet in the usual way through a circuit including line L—3 running from fuse F—2 through switch S—3 to a line L—4 going through the lights employed, which are indicated diagrammatically as a single bulb, and returning through line L—5 to fuse F—1. Another circuit passes from line L—3 through switch S—1 and line L—6 through a temperature control switch S—5, through line L—7 to refrigerator motor M—1, and thence to a main line L—8, which returns to fuse F—1 and so to power connection L—1. Another circuit passes again through line L—3, through switch S—2 and line L—9 to a pressure control switch S—6 and thence through pump motor M—2 to main line L—8.

A main control circuit line, L—10, which includes fuse F—3, is taken off fuse F—2 and passes through switch S—4 to a connection L—11 to the winding of a relay R and also to a connection L—12 to a counter C, which is shunted across the winding of the relay R, through connections L—13 and L—14. Line L—10 continues past its junction with connections L—11 and L—12 and terminates in armature connection R—1 of the relay R. When relay R is not energized, connection is made between line L—10 and armature R—1, through a stationary contact R—2, with a line L—15 which includes the winding of a slug solenoid 83 and a sold-out switch S—7, later described in detail. When the winding of relay R is energized, connection is made with stationary contact R—3, instead of with contact R—2, connecting line L—10 through a line L—16 with winding 80 of the solenoid valve 71 previously referred to. Current for energizing relay R is provided from line L—10 through connections L—11 and L—14, previously referred to, in either of two possible ways. The first connection is established through line L—17, coin switch S—8 and main line L—8 and exists only momentarily, whenever the coin switch S—8 is closed. A second or maintaining circuit is established through line L—18, leading through relay armature R—4 and stationary contact R—5 to line L—19 and end of travel switch S—9, previously referred to, and thus back to line L—8.

By means of the foregoing circuits, and assuming all switches S—1, S—2, S—3 and S—4 to be closed, the operation is as follows: The closing of coin switch S—8 momentarily, as a coin drops through the machine, causes current to flow momentarily from line L—10 to line L—8 through the winding of relay R, the circuit being made through connections L—11, L—14 and L—17 and the switch S—8. This causes the armatures R—1 and R—4 to be attracted toward the relay winding and establishes the maintaining circuit for the relay winding through connection L—18, armature R—4, stationary contact R—5, line L—19 and end of travel switch S—9. The armature R—1 will likewise establish a connection from line L—10 through stationary contact R—3 and line L—16, energizing the winding 80 of solenoid valve 71. This in turn admits water under pressure from the line 25, as previously described, to the hydraulic cylinder 66, delivers a beverage from the measuring cylinders and refills the same for the next operation. The completion of the stroke of the hydraulic cylinder opens limit switch S—9, breaking the retaining circuit for the relay and deenergizing the same. Armature R—4, accordingly, breaks contact with contact R—5 and armature R—1 breaks contact with stationary contact R—3 and remakes contact with stationary contact R—2. This returns the mechanism to the original starting condition in readiness for another operation.

The circuit leading from stationary contact R—2 through reject coil 83 and sold-out switch S—7, serves merely for the purpose of blocking the coin passage so as to return any coin which may be inserted when the cup supply is exhausted or when there is a current failure for any reason. The specific coin control utilized forms no part of the present invention and may be any of a number of well known coin controlled units now on the market and the same is true of the refrigerating unit employed. These features accordingly are not illustrated in detail.

At each operation of the hydraulic cylinder 66, water is withdrawn from line 19 and returned to tank 12, tending to reduce the pressure in the system. The delivery of a beverage will also diminish the quantity of carbonated water in tank 35 and thus tend, in some degree, to reduce the pressure in the system. Pressure control switch S—6 for pump 13 is accordingly set so as to operate pump 13 at each dispensing operation, so as to maintain constant or substantially constant pressure conditions in the system.

The withdrawal of water from tank 12 for operating the hydraulic cylinder and return thereof at each operation of the machine serves to agitate and aerate the water avoiding the stagnant conditions that would otherwise exist.

The entire mixing valve unit together with the carbonator assembly, water cooling coil 20 and the coils 84 (Figure 8), through which the refrigerant from refrigerating unit 16 passes, is immersed in water within the tank 9, resulting in maximum stability as to temperature. The temperature control switch for the refrigerator motor will preferably be set so as to maintain a temperature slightly above freezing.

Cup delivery mechanism

Figures 12, 13, 14, 15:
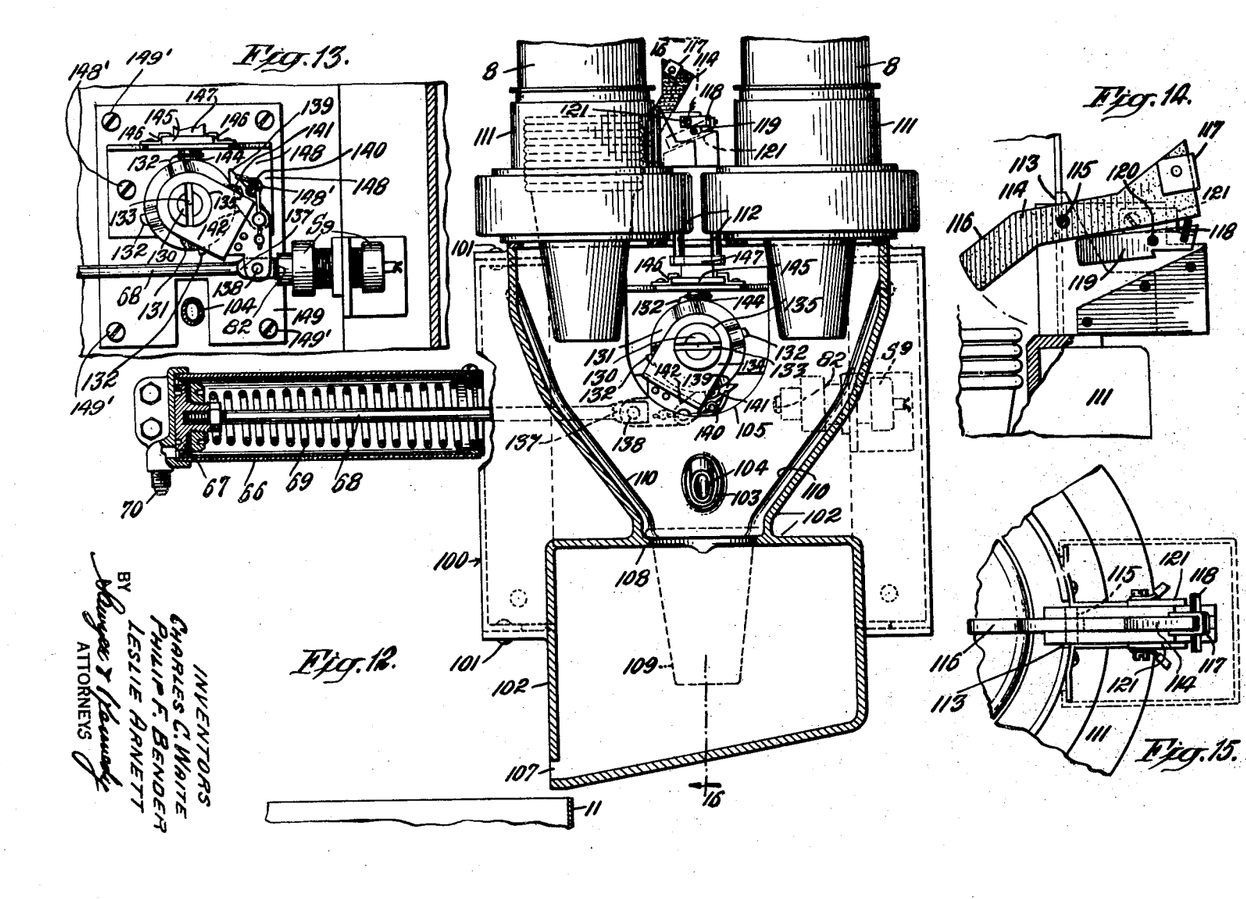
Figure 12 is an enlarged view of a portion of Figure 7 and showing particularly the delivery apparatus.
Figure 13 is a detail view of a portion of the actuating mechanism of Figure 12.
Figure 14 is an enlarged view of a trip switch operable upon emptying of a cup compartment and is taken on the line 14—14 of Figure 16.
Figure 15 is a plan view of the apparatus of Figure 14.

Fastened to the front of the cooling water tank 9, as best shown in Figures 12 and 16, is a framework 100 upon which is mounted, by means of pivots 101, a single piece delivery unit 102, preferably made of enameled iron or similar material, and which is formed with a rearward opening 103 to accommodate a liquid delivery spout 104, a second rearward opening 105 to accommodate the mixing valve actuating mechanism, a forward opening 106 in registry with cabinet opening 4 and affording access to the filled cups by the customer and also with top openings, as shown, to accommodate cup dispensers.

This unitary delivery unit may be conveniently considered as composed of an upper and lower section. The lower section is formed with a transversely sloping floor leading to a drain opening 107, which is positioned so as to drain into waste container 11, previously mentioned (Figure 7). The upper portion of the lower section is formed into cup supporting means comprising an inwardly extending flange 108 of suitable size to receive a cup 109, as indicated in dotted lines, so that the cup, while supported by its upper edge upon the flange, may be first filled from spout 104 and then withdrawn forwardly by the customer. The upper section of the delivery unit 102 is formed with sloping side walls having guide ribs 110 for directing cups from the cup dispensers into the dotted line position of Figures 12 and 16.

Mounted on top of the delivery unit 102 are a pair of cup dispensers 8, the lower ends of which contain dispensing mechanism 111 including an operating pin 112 and which is adapted to dispense cups alternately from the two columns one such cup being dispensed at each operation of the actuating mechanism. The specific form of cup dispensers employed forms no part of the present invention and hence requires no further description.

Passing through a slot 113 (Figure 14) in the wall of one of the cup dispensers is the lower end of an operating member 114 for sold-out switch S—7, previously referred to. This arm 114 is pivotally carried on a pin 115 and is shaped as shown so that when held back by cups the cup engaging edge 116 will be vertical. The other end of the member 114 carries a weight 117 which is located in the position of Figure 12 outside the pivot 115 and hence tends to swing to the position of Figure 14 so as to open the switch S—7 by striking the movable contact element 118 as shown in Figure 14. The contact element 118 is mounted on switch arm 119 which is carried on a pivot 120 so placed that the weight of the switch arm 119 urges it toward closed position (counter-clockwise in the figure). In closed position the contact element 118 comes against and is stopped by stationary contact elements 121, and in open position the switch arm is stopped in the position of Figure 14 by its inner end and the contact element 118, on opposite sides of the pivot 120, which are in contact with the member 114.

Valve actuating mechanism

The valve actuating mechanism previously referred to comprises a drive shaft 130 (Figures 2, 12, 13 and 16), upon which is carried a cam and ratchet mechanism, the body 131 of which is provided with four projecting studs 132 for engagement by intermediate parts attached to the hydraulic piston rod 68, previously referred to. The body member 131 is fastened in driving engagement with shaft 130 by means of a key 133, the latter being held in place by framework 134 rotatably carried by shoulders 135 turned in the member 131. The lower portion of framework 134 is formed to provide brackets 136 to which a flattened end 137 of the rod 68 is pivotally connected by a pin 138. Also carried upon the framework 134 is a pawl 139 urged toward the member 131 by a spring 140 and having a recess 141 for engaging the pins 132. At each stroke of rod 68 the rearward wall of recess 141 serves as an abutment to drive the member 131 by means of a pin 132 from the position of Figure 12 through an angle of 90°. Upon completion of this stroke the end of rod 68 strikes the actuating plunger 82 of limit switch S—9, thus permitting the spring 69 to return rod 68 to the position of Figure 12, as previously described. The forward wall of recess 141 is beveled to lift the pawl on the return stoke, clearing it from pin 132 and the pawl surface 142 located rearwardly of the recess is likewise slanted so as to pass over the next pin 132 on the return stroke and permit the same to be engaged within recess 141 preparatory to the next operation of the machine.

Member 131 is also formed with a spiral groove or cam track 143 which receives a roller 144 to which in turn is connected a slide 145 movable back and forth in a slideway 146 and carrying a connecting member 147 for operating the cup dispensers. The forward and rearward or "high" and "low" points of the cam track 143 are located opposite the pins 132, so that if the cam track is at its furthermost forward postion adjacent one of the pins 132, it is at its rearmost position adjacent the next pin 132, at its foremost position again adjacent the next one, and so on. In this way each 90° turn of the member 131 will move the roller 144 from its foremost to its rearmost position, or vice versa, as the case may be, thus providing a suitable actuating movement for the alternately operating cup dispensers 111. Member 131 is conveniently made part of a detachable unit, which includes also a support bracket 148 for the slideway 146, which is mounted on a support plate 149, by means of screws 148', the plate 149 being, in turn, attached to tank 9 by means of screws 149' (Figures 2 and 13). In this way member 131, together with its connected parts, may conveniently be removed when access to the valve is desired for servicing.

The valve body casting 150 is fastened within the tank 9 by means of screws 151, the joint being sealed by a gasket 152, and is formed with a threaded opening 153 adapted to receive a threaded housing member 154, which encloses the valve mechanism proper. Shaft 130 passes through an opening in the forward wall of housing 154 and terminates in a bearing nose 155 seating in a depression in the movable valve member. Carried upon shaft 130 within the housing 154 are pressure discs 156 and a compression spring 157 intermediate the pressure discs. The rearward pressure disc is attached to shaft 130 by a pin 158 and the forward pressure disc is attached thereto by a pin 159 carried in a slot 160, so as to permit movement along the shaft. The rearward pressure disc is in turn coupled to the moving valve member 161 by a pin 162 carried on the latter and engaging in a recess 163 in the former.

By means of this mechanism and the hydraulic actuating mechanism therefor, as previously described, it is possible to force the moving valve member 161 against its seat with very heavy compression while still obtaining the required rotary movements of the valve, this being a very desirable feature. Moving valve member 161 seats against a packing member 164 made of treated leather, such as is well known in the art for use in beverage valves. As will be understood, the packing member 164 is provided with openings in registry with those of the moving and stationary valve members, as previously described in connection with Figures 3 to 6.

Mixing and measuring mechanism

The casting 150 is formed so as to constitute one end of each of the measuring cylinders 39 and 41, previously referred to. As best shown in Figures 2 and 3, the carbonated water cylinder 39 includes an inner end formed by the casting 150, which includes an annular groove 170 in which is positioned a gasket 171. The cylinder wall 172 abuts against this gasket and against a similar gasket 173 carried in an annular groove 174 formed in an outer head member 175. The syrup cylinder construction, similarly, includes a portion of the body casting 150, having an annular groove 176 within which is positioned a gasket member 177, a cylinder wall 178 and an outer end gasket 179 carried in an annular groove 180 formed in the outer head member 181. The piston construction require no special comment other than to note that the piston rod packing 182 is inserted from the carbonated water end and compressed by a nut 183 carried in a threaded bore 184 as shown.

The cylinder assembly as thus described is held together for ready disassembly by means of rods 185 as shown in Figure 3, which fasten the heads 175 and 181 securely against the casting 150. As will be understood, four such rods will be employed for each cylinder, only those on one side being shown in Figure 3.

The syrup and carbonated water passages previously referred to are partly formed in the casting 150 and are partly external thereto. The external portions of these passages consist of a pipe connection 186 to the head 175, which forms part of passage 50, and a similar connection 187 to the head 181, and which forms part of passage 52'.

The discharge passages 48 and 54 heretofore referred to generally are best shown in Figures 2 and 16 and form an important feature of the invention. The principal objects to be obtained by the design about to be described are a thorough mixing of the components of the beverage, the dissipation of pressure head so as to produce substantially a mere gravity flow at atmospheric pressure from the outlet pipe 104 and the carrying out of this process in an atmosphere consisting of substantially pure carbon dioxide and under cooling tank temperature conditions. Referring now to Figure 16, it will be observed that the carbonated water delivery passage, heretofore referred to as passage 48, includes a number of successive passages 190, 191, 192 and 193. The passageway 190 opens off port 47 and contains a restricted orifice or bore 190' adjacent this port. The passage 190 terminates in a vertical passage or expansion chamber 191 off which branches a downwardly slanting passage 192 which is shortly expanded into a passage 193 of larger bore, which in turn communicates with delivery pipe 104. The syrup passage 54 includes a portion formed in the casting 150 and opening into the bore 193 at 194, and also the bore 193 beyond this point. Located within the chamber 191 and positioned centrally therein is a member 195 detachably mounted in the casting 150 by a screw threaded portion 196 and comprising a concave and rounded lower surface 197 substantially in registry with the lower surface of bore 192, and shank 198 extending upwardly from this rounded surface and carrying a button 199 at its upper end at a point intermediate the junctures of passages 190 and 192 of the chamber 191. The upper end of the button 199 is preferably rounded as shown.

In these passages, as described, carbonated water will first be forced to pass through a sharply restricted orifice 190' emerging into an expansion chamber consisting of the passage 190 and the upper portion of the bore 191, above the button 199. The angular disposition of the bore 191 with relation to the passage 190 will break up the velocity of the jet or stream. The carbonated water next flows past the button 199 through the annular opening between it and the wall of bore 191 and emerges into the passages 192 and 193, velocity being again dissipated due to the angular disposition of the passage 192. By suitably proportioning the orifice 190' and the annular orifice around the button 199 the carbonated water may be dispensed at atmospheric pressure with substantially a gravity flow. In the example illustrated, which is a high pressure system, the carbonated water is reduced from a pressure of about seventy-five pounds to atmospheric. In such case the annular orifice around the button 199 may be made with a flow area approximately fifty times as great as that of the orifice 190' and the construction will be found to operate satisfactorily under the necessary variations in pressure which occur in the carbonated water entering the orifice 190'. This result is achieved by reason of the fact that the flow through the orifice 190' depends upon the carbonated water pressure at its entrance and the pressure obtaining within the passage 190, while the flow around the button 199 depends in turn upon the pressure in the upper end of the bore 191. Accordingly, by suitably proportioning the orifice 190' and the annular orifice around the button 199, a condition may be created in which sufficiently low pressure is maintained in the upper end of the bore 191 to achieve a gravity flow therefrom, while the resistance of the orifice 190' maintains a rate of flow into the expansion chamber above the bore 191 equal to the rate of discharge past button 199. As will be apparent, by suitable proportioning of the orifices and expansion chamber therebetween the construction of the invention may readily be used for dispensing carbonated water from a carbonating system operating at any of the usual pressures. The various passageways leading from the valve to the delivery tube 104 will become filled with carbon dioxide when the machine is operated and will maintain a carbon dioxide atmosphere for a considerable length of time. Under these conditions uniform carbonation of the carbonated water leaving the tube 104 is readily attained and the fact that the carbonated water emerges from this tube with a gravity flow prevents undue dissipation of the carbon dioxide in filling the cup.

What is claimed is:

1. In beverage dispensing apparatus, a mixing valve comprising a valve seat having a set of four syrup ports and a set of four water ports, and a movable valve member having corresponding sets of syrup and water ports and having also internal channels interconnecting said syrup and water ports, respectively, in pairs, a syrup measuring cylinder and a water measuring cylinder, means for connecting the respective ports of each set of valve seat ports to a liquid supply source, to a discharge outlet and to each end of the corresponding measuring cylinder, and means for moving said movable valve member to connect the ends of said cylinders through said channels alternately to the liquid supply sources and discharge outlets.

2. Beverage dispensing apparatus according to claim 3, in which each said set of ports comprises four ports arranged in a square, and the means for moving the said movable member comprises means for rotating the same in ninety degree steps.

3. Beverage dispensing apparatus comprising a water container and a syrup container and means for withdrawing and mixing water and syrup in measured quantities from said containers, the said means including a mixing valve comprising a valve seat and a sliding movable valve member, a hydraulic cylinder for operating the said valve, means for introducing water into said cylinder to operate the same, and means for discharging water from said cylinder after each operation thereof.

4. Beverage dispensing apparatus comprising a water container and a syrup container and means for withdrawing and mixing water and syrup in measured quantities from said containers, the said means including a mixing valve, a hydraulic cylinder for operating the said valve, means for introducing water from said water container into said cylinder to operate the same, and means for returning water from said cylinder to said water container after each operation of said cylinder.

5. Beverage dispensing apparatus comprising a water container and syrup container, means for measuring and mixing water and syrup from said containers, and comprising a pump having an intake in said water container, a pressure system connected to the discharge of the said pump, a mixing valve having connections to said syrup container and to said pressure system, a hydraulic cylinder for operating the said mixing valve, means for operatively connecting said cylinder to said pressure system, and means for returning water from said cylinder to said water container after operation.

6. In liquid dispensing apparatus, a mixing valve comprising a valve seat having a first set of four ports and a second set of four ports, and a rotatable valve member having corresponding first and second sets of ports and having also internal channels interconnecting said first and second sets of ports, respectively, in pairs, a first measuring cylinder and a second measuring cylinder, means for connecting the respective ports of each set of valve seat ports to a liquid supply source, to a discharge outlet and to each end of the corresponding measuring cylinder, and means for repetitively moving said rotating valve in one direction in steps to connect the ends of said cylinders through said channels alternately to the liquid supply sources and discharge outlet.

7. Liquid dispensing apparatus according to claim 6 in which each said set of ports comprises four ports arranged in a square, and the means for moving the said valve member comprises hydraulically actuated means including ratchet means for rotating the same in ninety degree steps.

8. In beverage dispensing apparatus, in combination, axially aligned syrup and water measuring cylinders having pistons therein and a mixing valve, a unitary body member forming one head of each of said cylinders and the seat for said valve, said seat being disposed therein on a plane substantially parallel to and spaced apart from the axes of said cylinders, said seat being embraced by a mounting flange forming a support for both said cylinders and said valve, said member also having internal bores forming connections between said valve seat and said cylinders and additional internal bores for connecting said valve seat to sources of syrup and water and to discharge outlets for syrup and water.

9. Apparatus according to claim 8 wherein said cylinders are double acting and wherein some of said internal bores communicate with adjacent ends of said cylinders and others of said internal bores communicate with the opposite or outer ends of said cylinders via conduits.

CHARLES C. WAITE.
PHILIP F. BENDER.
LESLIE ARNETT.

REFERENCES CITED

The following references are of record in the file of this patent:

UNITED STATES PATENTS

| Number | Name | Date |
|---|---|---|
| 1,505,122 | Allwardt | Aug. 19, 1924 |
| 928,588 | Cornish | July 20, 1909 |
| 1,758,552 | Allen et al. | May 13, 1920 |
| 1,003,256 | Hardy | Sept. 12, 1911 |
| 1,513,692 | Callahan et al. | Nov. 4, 1924 |
| 2,085,848 | Cornelius | May 2, 1939 |
| 1,654,004 | Line | Dec. 27, 1927 |
| 2,165,959 | Christianson | July 11, 1939 |